United States Patent
Hoshikawa et al.

(10) Patent No.: US 10,837,347 B2
(45) Date of Patent: Nov. 17, 2020

(54) CONTROL METHOD FOR INTERNAL COMBUSTION ENGINE AND CONTROL DEVICE FOR INTERNAL COMBUSTION ENGINE

(71) Applicant: NISSAN MOTOR CO., LTD., Yokohama (JP)

(72) Inventors: Hiroaki Hoshikawa, Kanagawa (JP); Kakuzou Kaneko, Kanagawa (JP); Tomohiro Kawata, Kanagawa (JP); Takayoshi Ichihara, Kanagawa (JP); Kazuo Muraki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/609,499

(22) PCT Filed: May 1, 2017

(86) PCT No.: PCT/JP2017/017110
§ 371 (c)(1),
(2) Date: Oct. 30, 2019

(87) PCT Pub. No.: WO2018/203361
PCT Pub. Date: Aug. 11, 2018

(65) Prior Publication Data
US 2020/0141302 A1 May 7, 2020

(51) Int. Cl.
*F01P 7/16* (2006.01)
*F01P 3/02* (2006.01)
(Continued)

(52) U.S. Cl.
CPC ............... *F01P 7/16* (2013.01); *F01P 3/12* (2013.01); *F01P 7/14* (2013.01); *F01P 11/16* (2013.01);
(Continued)

(58) Field of Classification Search
CPC .......... F01P 7/16; F01P 3/12; F01P 2003/001; F01P 2003/021; F01P 7/14; F01P 11/16;
(Continued)

(56) References Cited

U.S. PATENT DOCUMENTS

| 5,924,412 | A | 7/1999 | Suzuki et al. | |
| 2010/0326399 | A1* | 12/2010 | Pendray | F02M 27/04 123/25 J |
| 2015/0354475 | A1* | 12/2015 | Ikemoto | G01N 25/66 123/41.02 |

FOREIGN PATENT DOCUMENTS

| EP | 2 947 302 A1 | 11/2015 |
| JP | 63-005108 A | 1/1988 |

(Continued)

*Primary Examiner* — Jacob M Amick
(74) *Attorney, Agent, or Firm* — Foley & Lardner LLP

(57) ABSTRACT

A control method and a control device are provided for an internal combustion engine structured to vary a mechanical compression ratio by varying a range of slide of a piston with respect to a cylinder bore, and structured to control a flow of cooling water in a water jacket formed around the cylinder bore, wherein variation of the mechanical compression ratio causes the piston to slide on a corroded portion formed in the cylinder bore. A control process includes: acquiring a temperature correlating with a cylinder bore wall temperature; and stopping the flow of cooling water in the water jacket, in response to a condition that the acquired temperature is lower than a preset temperature point.

8 Claims, 4 Drawing Sheets

(51) Int. Cl.
  *F02B 75/04*    (2006.01)
  *F01P 3/12*     (2006.01)
  *G01N 25/66*    (2006.01)
  *F01P 11/16*    (2006.01)
  *F02D 35/02*    (2006.01)
  *F01P 7/14*     (2006.01)
  *F01P 3/00*     (2006.01)

(52) U.S. Cl.
  CPC .......... *F02B 75/048* (2013.01); *F02D 35/025* (2013.01); *G01N 25/66* (2013.01); *F01P 2003/001* (2013.01); *F01P 2003/021* (2013.01); *F01P 2025/31* (2013.01); *F01P 2037/00* (2013.01)

(58) Field of Classification Search
  CPC ............... F01P 2037/00; F01P 2025/08; F01P 2025/31; F01P 3/02; F02B 75/048; F02B 75/04; F02D 35/025; G01N 25/66
  See application file for complete search history.

(56) References Cited

FOREIGN PATENT DOCUMENTS

| | | |
|---|---|---|
| JP | 10-110654 A | 4/1998 |
| JP | 2012-021460 A | 2/2012 |
| JP | 2016-113945 A | 6/2016 |
| WO | WO 2014/112538 A1 | 7/2014 |
| WO | WO-2014/119354 A1 | 8/2014 |

\* cited by examiner

CONTROL METHOD FOR INTERNAL
COMBUSTION ENGINE AND CONTROL
DEVICE FOR INTERNAL COMBUSTION
ENGINE

BACKGROUND

The present invention relates to a control device and a control method for an internal combustion engine structured to vary a compression ratio.

A patent document 1 discloses an internal combustion engine that includes: an in-cylinder-injection-use fuel injection valve for injecting fuel into a combustion chamber; a port-injection-use fuel injection valve for injecting fuel into an intake port; and a variable compression ratio mechanism structured to vary a mechanical compression ratio.

According to patent document 1, when corrosion may occur in a tip end portion of a nozzle of the in-cylinder-injection-use fuel injection valve, the occurrence of corrosion is suppressed by increasing the mechanical compression ratio of the internal combustion engine, and allocating an entire quantity of fuel injection to port injection from the port-injection-use fuel injection valve.

However, patent document 1 merely addresses suppression of the occurrence of corrosion in the tip end portion of the in-cylinder-injection-use fuel injection valve.

For example, when a temperature of cooling water of the internal combustion engine is low, adhesion of condensed water on an inner peripheral surface of a cylinder bore may cause corrosion in the inner peripheral surface of the cylinder bore by acid formed from condensed water and nitrogen oxides (NOx) contained in combustion gas.

If the mechanical compression ratio of the internal combustion engine is controlled variably under a condition that condensed water adheres to the inner peripheral surface of the cylinder bore, a piston ring slides on a corroded portion of the cylinder bore, and thereby causes a corroded piece to fall off the corroded portion. When the mechanical compression ratio becomes low, a part which the corroded piece falls off may be newly corroded so that corrosion of the cylinder bore may progress.

Namely, there is room for improvement in delaying the progress of corrosion which may occur in the internal combustion engine structured to vary the mechanical compression ratio.

PRIOR ART DOCUMENT(S)

Patent Document(s)

Patent Document 1: Japanese Patent Application Publication No. 2016-113945

SUMMARY

For an internal combustion engine structured to vary a mechanical compression ratio by varying a range of slide of a piston with respect to a cylinder bore, and structured to control a flow of cooling water in a water jacket formed around the cylinder bore, one or more embodiments of the present invention includes: acquiring a temperature correlating with a cylinder bore wall temperature; and stopping the flow of cooling water in the water jacket, in response to a condition that the acquired temperature is lower than a preset temperature point.

According to one or more embodiments of the present invention, it is possible to early increase the cylinder bore wall temperature, and early resolve adhesion of condensed water to the inner peripheral surface of the cylinder bore, and thereby delay the progress of corrosion.

DETAILED DESCRIPTION

The following describes an embodiment of the present invention in detail with reference to the drawings.

Figure 1:
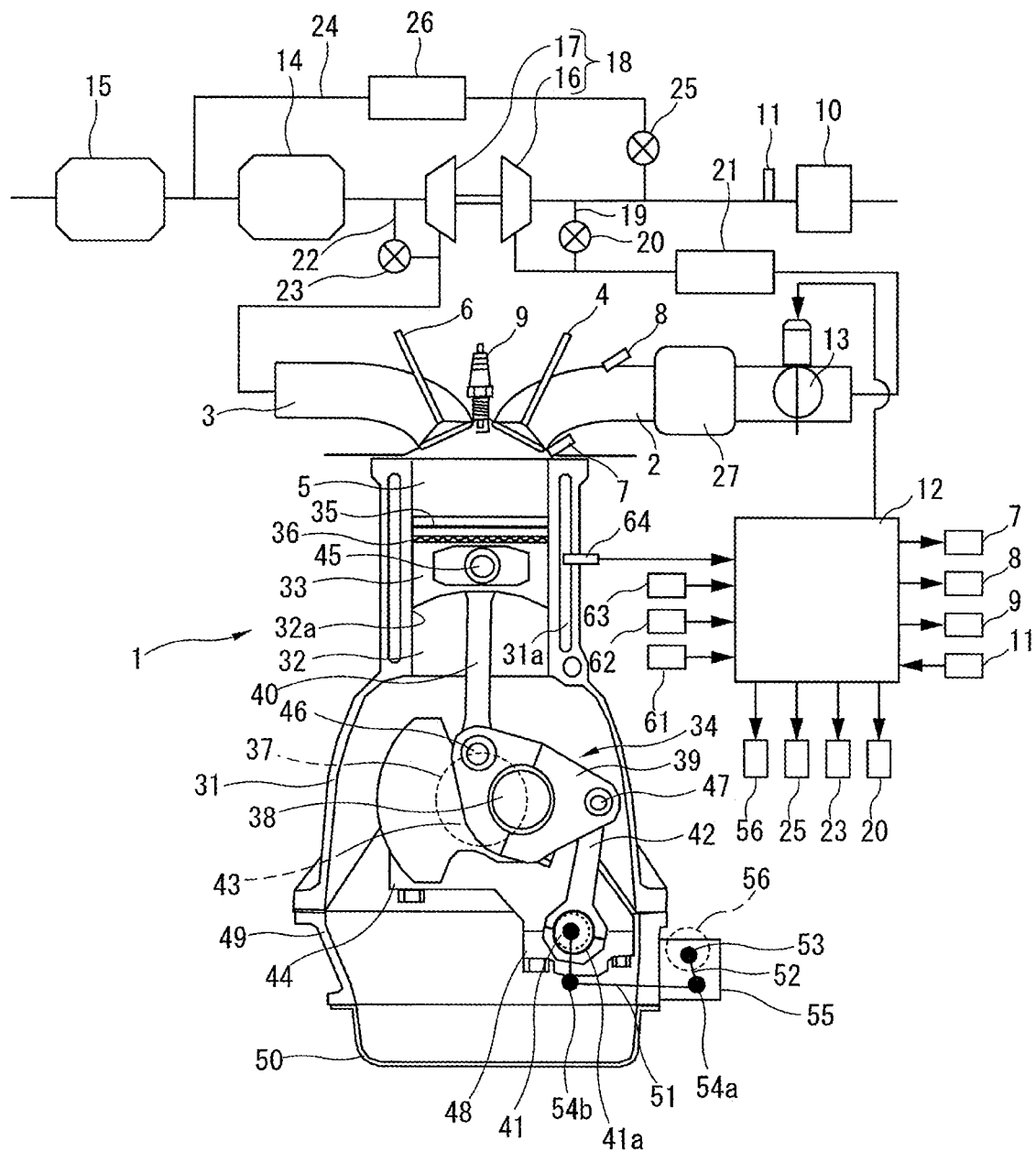
FIG. 1 is an illustrative view showing schematic configuration of a control device of an internal combustion engine according to the present embodiment.

FIG. 1 is an illustrative view showing schematic configuration of a control device of an internal combustion engine 1 according to the present embodiment, to which a control method of internal combustion engine 1 according to the present embodiment is applicable.

Internal combustion engine 1 is mounted as a drive source on a vehicle such as an automotive vehicle, including an intake passage 2 and an exhaust passage 3. Intake passage 2 is connected to a combustion chamber 5 via an intake valve 4. Exhaust passage 3 is connected to combustion chamber 5 via an exhaust valve 6.

Internal combustion engine 1 includes a first fuel injection valve 7 and a second fuel injection valve 8. First fuel injection valve 7 injects fuel directly into combustion chamber 5. Second fuel injection valve 8 injects fuel into intake passage 2 upstream of intake valve 4. The fuel injected by first fuel injection valve 7 and second fuel injection valve 8 is ignited in combustion chamber 5 by a spark plug 9.

Intake passage 2 is provided with an air cleaner 10, an air flow meter 11, and a throttle valve 13. Air cleaner 10 collects foreign matter in intake air. Air flow meter 11 measures a quantity of intake air. Throttle valve 13 is an electronic throttle valve whose opening is controlled in accordance with a control signal from a control unit 12.

Air flow meter 11 is disposed upstream of throttle valve 13. Air flow meter 11 contains a temperature sensor, and is structured to measure a temperature of intake air at an intake air inlet, Ta. Namely, air flow meter 11 serves as an intake air temperature acquiring section to acquire a temperature correlating with an intake air temperature. Air cleaner 10 is disposed upstream of air flow meter 11.

Exhaust passage 3 is provided with an upstream exhaust catalyst 14 such as a three-way catalyst, and a downstream exhaust catalyst 15 such as a NOx trap catalyst. Downstream exhaust catalyst 15 is disposed downstream of upstream exhaust catalyst 14.

Internal combustion engine 1 further includes a turbocharger 18. Turbocharger 18 includes a compressor 16 disposed in intake passage 2, and an exhaust turbine 17 disposed in exhaust passage 3, wherein compressor 16 and exhaust turbine 17 are arranged coaxially. Compressor 16 is disposed upstream of throttle valve 13, and downstream of air flow meter 11. Exhaust turbine 17 is disposed upstream of upstream exhaust catalyst 14.

Intake passage 2 is connected to a recirculation passage 19. Recirculation passage 19 includes a first end connected to a section of intake passage 2 upstream of compressor 16, and a second end connected to a section of intake passage 2 downstream of compressor 16.

Recirculation passage 19 is provided with a recirculation valve 20. Recirculation valve 20 is an electronic recirculation valve structured to relieve a boost pressure from the section downstream of compressor 16 to the section upstream of compressor 16. Recirculation valve 20 may be implemented by a so-called check valve structured to open only when pressure downstream of compressor 16 becomes higher than or equal to a preset pressure point.

Intake passage 2 is further provided with an intercooler 21. Intercooler 21 is disposed downstream of compressor 16, and is structured to cool intake air that is compressed (pressurized) by compressor 16, for improvement in charging efficiency. Intercooler 21 is disposed downstream of the downstream end of recirculation passage 19, and upstream of throttle valve 13.

Exhaust passage 3 is connected to an exhaust bypass passage 22. Exhaust bypass passage 22 bypasses exhaust turbine 17, and connects a section upstream of exhaust turbine 17 to a section downstream of exhaust turbine 17. Exhaust bypass passage 22 includes a downstream end connected to a section of exhaust passage 3 upstream of upstream exhaust catalyst 14. Exhaust bypass passage 22 is provided with a wastegate valve 23. Wastegate valve 23 is an electronic wastegate valve that controls a quantity of exhaust gas in exhaust bypass passage 22. Wastegate valve 23 is structured to bypass a part of exhaust gas, which is to be introduced to exhaust turbine 17, to the section downstream of exhaust turbine 17, and thereby control the boost pressure of internal combustion engine 1.

Internal combustion engine 1 further includes an EGR passage 24. EGR passage 24 is branched from exhaust passage 3 and connected to intake passage 2, and is structured to perform exhaust gas recirculation (EGR) that introduces (recirculates) a part of exhaust gas as EGR gas from exhaust passage 3 into intake passage 2. EGR passage 24 includes a first end connected to a section of exhaust passage 3 between upstream exhaust catalyst 14 and downstream exhaust catalyst 15, and a second end connected to a section of intake passage 2 downstream of air flow meter 11 and upstream of compressor 16. EGR passage 24 is provided with an EGR valve 25 and an EGR cooler 26. EGR valve 25 is an electronic EGR valve that controls a flow rate of EGR gas in EGR passage 24. EGR cooler 26 is structured to cool EGR gas. As shown in FIG. 1, intake passage 2 includes a collector section 27.

Internal combustion engine 1 further includes a variable compression ratio mechanism 34 that is structured to vary a mechanical compression ratio of internal combustion engine 1 by varying a top dead center position of a piston 33 that slides in a cylinder bore 32 of a cylinder block 31. Namely, internal combustion engine 1 is structured to vary the mechanical compression ratio by varying a range of slide of piston 33 with respect to an inner peripheral surface 32a of cylinder bore 32. In other words, internal combustion engine 1 is structured to vary the mechanical compression ratio by varying a range of slide of piston 33 with respect to the cylinder. The mechanical compression ratio is determined by the top dead center position and bottom dead center position of piston 33.

Piston 33 includes a first piston ring 35 and a second piston ring 36, wherein first piston ring 35 is closer to a piston crown of piston 33 than second piston ring 36. Each of first piston ring 35 and second piston ring 36 is a so-called compression ring, and serves to eliminate a clearance between inner peripheral surface 32a of cylinder bore 32 and piston 33, and thereby maintain hermeticity.

Variable compression ratio mechanism 34 employs a multilink piston-crank mechanism in which piston 33 is linked with a crank pin 38 of a crankshaft 37 via a plurality of links. Variable compression ratio mechanism 34 includes a lower link 39, an upper link 40, a control shaft 41, and a control link 42. Lower link 39 is rotatably attached to crank pin 38. Upper link 40 links lower link 39 with piston 33. Control shaft 41 includes an eccentric shaft part 41a. Control link 42 links eccentric shaft part 41a of control shaft 41 with lower link 39.

Crankshaft 37 includes journals 43 and crank pins 38. Journal 43 is rotatably supported between cylinder block 31 and a crankshaft bearing bracket 44.

Upper link 40 includes a first end rotatably attached to a piston pin 45, and a second end rotatably linked with lower link 39 via a first connection pin 46. Control link 42 includes a first end rotatably linked with lower link 39 via a second connection pin 47, and a second end rotatably attached to eccentric shaft part 41a of control shaft 41. First connection pin 46 and second connection pin 47 are pressed into and fixed to lower link 39.

Control shaft 41 is arranged in parallel to crankshaft 37, and is rotatably supported by cylinder block 31. Specifically, control shaft 41 is rotatably supported between crankshaft bearing bracket 44 and a control shaft bearing bracket 48.

Cylinder block 31 includes a lower part to which an oil pan upper part 49 is attached. Oil pan upper part 49 includes a lower part to which an oil pan lower part 50 is attached.

Control shaft 41 receives input of rotation of a drive shaft 53 that is transmitted via an actuator link 51 and a drive shaft arm 52. Drive shaft 53 is disposed outside of oil pan upper part 49, and is arranged parallel to control shaft 41. Drive shaft arm 52 is fixed to drive shaft 53.

Actuator link 51 includes a first end rotatably linked with drive shaft arm 52 via a pin 54a. Actuator link 51 is a narrow rod-shaped member that is arranged to be perpendicular to control shaft 41, and includes a second end rotatably linked via a pin 54b with a portion of control shaft 41 eccentric from a rotation center of control shaft 41.

Drive shaft 53, drive shaft arm 52, and the first end portion of actuator link 51 are mounted in a housing 55 that is attached to a side face of oil pan upper part 49.

Drive shaft 53 includes a first end connected to an electric motor 56 as an actuator via a speed reducer not shown. Namely, drive shaft 53 is rotationally driven by electric motor 56. The rotation speed of drive shaft 53 results from reduction from the rotation speed of electric motor 56 by the speed reducer.

As drive shaft 53 is rotated by electric motor 56, actuator link 51 travels along a plane perpendicular to drive shaft 53. The travel of actuator link 51 causes a swinging motion of the place of linkage between the second end of actuator link 51 and control shaft 41, and thereby rotates control shaft 41. As control shaft 41 rotates and varies its rotational position, eccentric shaft part 41a varies its position, wherein eccentric shaft part 41a serves as a fulcrum of swinging motion of control link 42. In this way, by variation of the rotational position of control shaft 41 by electric motor 56, the attitude of lower link 39 varies, to cause a variation in piston motion (stroke characteristics) of piston 33, namely, a variation in the top dead center position and bottom dead center position of piston 33, so that the mechanical compression ratio of internal combustion engine 1 is continuously varied.

Rotation of electric motor 56 is controlled by control unit 12. Namely, control unit 12 serves as a compression ratio control section to vary the mechanical compression ratio of internal combustion engine 1 by variable compression ratio mechanism 34.

The mechanical compression ratio of internal combustion engine 1 is controlled based on an operating condition of internal combustion engine 1 (engine operating condition). For example, variable compression ratio mechanism 34 is controlled to set the mechanical compression ratio such that the mechanical compression ratio decreases as the operating condition of internal combustion engine 1 increases in speed and load.

Control unit 12 is a publicly known digital computer that contains a CPU, a ROM, a RAM, and input/output interfaces.

Control unit 12 receives input of sensing signals from various sensors, namely, air flow meter 11, a crank angle sensor 61 for sensing a crank angle of crankshaft 37, an accelerator opening sensor 62 for sensing an amount of depression of an accelerator pedal, a rotation angle sensor 63 for sensing a rotation angle of drive shaft 53, a water temperature sensor 64 for sensing a cooling water temperature Tw, etc. Control unit 12 calculates a requested load of the internal combustion engine (i.e. engine load), based on a sensing value of accelerator opening sensor 62.

Crank angle sensor 61 is structured to measure the engine speed of internal combustion engine 1.

Water temperature sensor 64 serves as a wall temperature acquiring section to acquire a temperature of cooling water flowing around cylinder bore 32, as a temperature correlating with a cylinder bore wall temperature. In other words, water temperature sensor 64 acquires a temperature of cooling water flowing around the inner peripheral surface of the cylinder, as a temperature correlating with the cylinder bore wall temperature. The cylinder bore wall temperature is a wall temperature of inner peripheral surface 32*a* of cylinder bore 32. In other words, the cylinder bore wall temperature is a wall temperature of the inner peripheral surface of the cylinder. In the present embodiment, water temperature sensor 64 measures a temperature of cooling water in a water jacket 31*a* of cylinder block 31.

Based on the sensing signals from the various sensors, control unit 12 optimally controls the fuel injection quantity and fuel injection timing of each of first fuel injection valve 7 and second fuel injection valve 8, the ignition timing of spark plug 9, the opening of throttle valve 13, the opening of recirculation valve 20, the opening of wastegate valve 23, the opening of EGR valve 25, the mechanical compression ratio of internal combustion engine 1 set by variable compression ratio mechanism 34, etc.

Furthermore, control unit 12 controls a flow path switching valve 66 that is an electronic flow path switching valve (MCV) structured as a cooling water control section to control the flow of cooling water in water jacket 31*a*.

Figure 2:
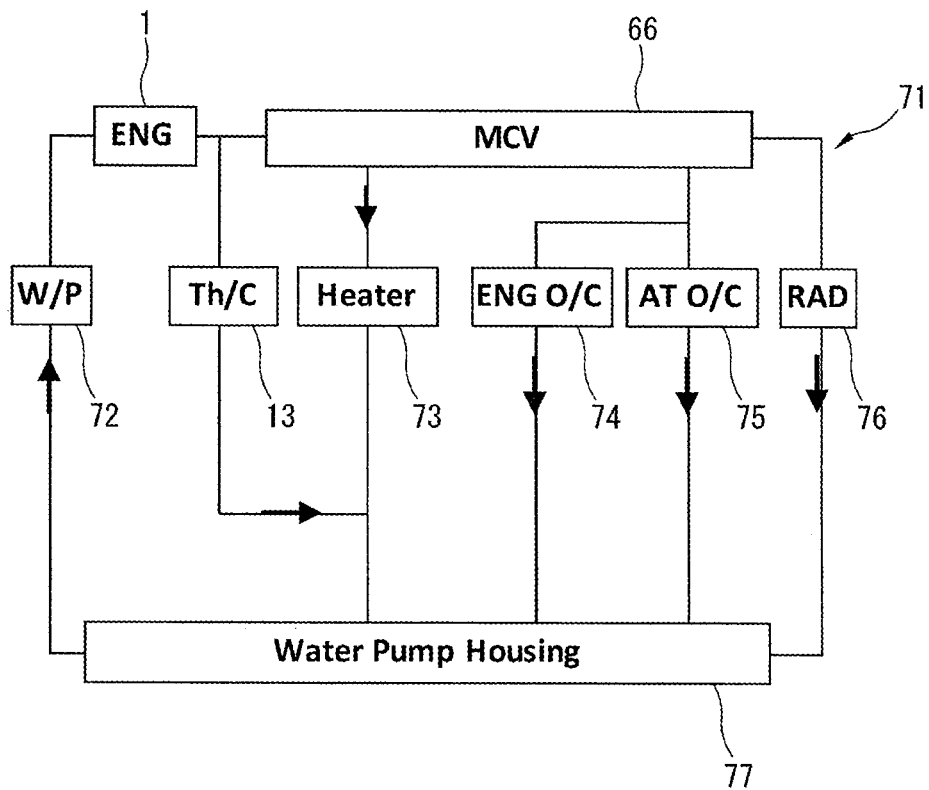
FIG. 2 is an illustrative view showing schematic configuration of a circulation system of cooling water.

FIG. 2 is an illustrative view showing schematic configuration of a circulation system 71 of cooling water which is provided with flow path switching valve 66.

Circulation system 71 serves to circulate cooling water for cooling the internal combustion engine 1. In circulation system 71, cooling water is circulated by a water pump 72 that is driven by internal combustion engine 1.

In circulation system 71, cooling water is supplied to throttle valve 13, a heater 73, an oil cooler 74 for cooling engine oil of internal combustion engine 1 (i.e. engine oil cooler), an oil cooler 75 for cooling working oil of an automatic transmission not shown (i.e. transmission oil cooler), a radiator 76, etc.

Heater 73 is a component of an air conditioner for an interior space of a vehicle on which internal combustion engine 1 is mounted. Radiator 76 exchanges heat between cooling water and outside air.

Water pump 72 discharges cooling water, which is supplied to internal combustion engine 1. The cooling water supplied to internal combustion engine 1 flows to flow path switching valve 66 via water jacket 31*a* of cylinder block 31. In circulation system 71, heater 73, oil coolers 74, 75, and radiator 76 are disposed downstream of flow path switching valve 66. Namely, the quantity of cooling water flowing into each of heater 73, oil coolers 74, 75, and radiator 76 is controlled by flow path switching valve 66.

Figure 3:
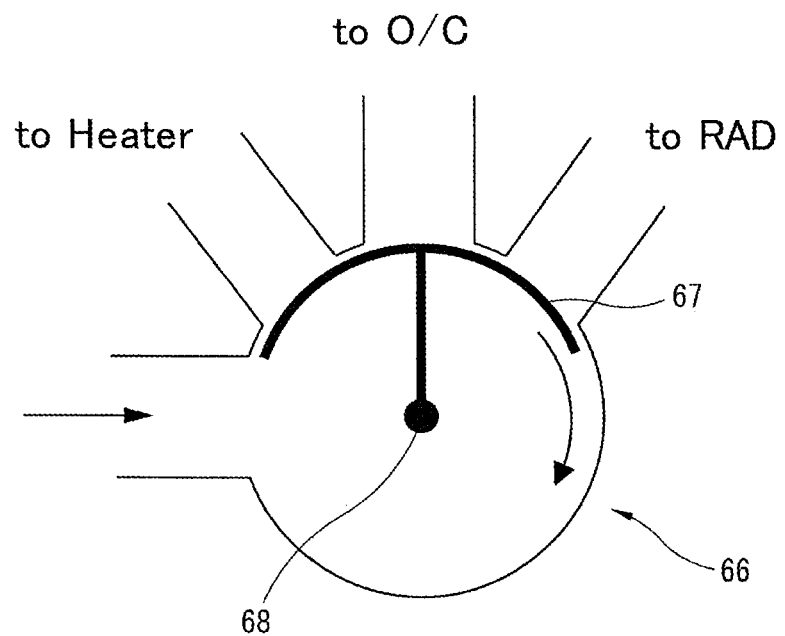
FIG. 3 is an illustrative view showing schematic configuration of a flow path switching valve.

FIG. 3 is an illustrative view showing schematic configuration of flow path switching valve 66. Flow path switching valve 66 includes a valve element 67 having an arc-shaped cross section, and a rotation shaft 68 as a center of rotation of valve element 67.

FIG. 3 shows a fully-closed state where all of the flows of cooling water to the downstream components are stopped.

Flow path switching valve 66 is structured to be in the following states by rotation of valve element 67 around rotation shaft 68: the fully-closed state where all of the flows of cooling water to the downstream components are stopped; a state where cooling water is supplied only to heater 73; a state where cooling water is supplied to heater 73 and oil coolers 74, 75; and a fully-opened state where cooling water is supplied to heater 73, oil coolers 74, 75, and radiator 76.

Flow path switching valve 66 is made to bring valve element 67 into the fully-closed state, when the temperature of cooling water is lower than a preset temperature point Twth described below. When the temperature of cooling water becomes higher than preset temperature point Twth, flow path switching valve 66 is controlled to start the flows of cooling water to heater 73, oil coolers 74, 75, and radiator 76 in a stepwise manner.

Specifically, for example, when the cooling water temperature is lower than preset temperature point Twth, flow path switching valve 66 is controlled into a state shutting off all of the flows of cooling water to heater 73, oil coolers 74, 75, and radiator 76 (i.e. fully-closed state). For example, when the cooling water temperature is higher than or equal to preset temperature point Twth and lower than a first switching temperature point, flow path switching valve 66 is controlled to supply cooling water to heater 73, and no cooling water to oil coolers 74, 75 and radiator 76. For example, when the cooling water temperature is higher than or equal to the first switching temperature point and lower than a second switching temperature point, flow path switching valve 66 is controlled to supply cooling water to heater 73 and oil coolers 74, 75, and no cooling water to radiator 76. For example, when the cooling water temperature is higher than or equal to the second switching temperature point, flow path switching valve 66 is controlled to supply cooling water to heater 73, oil coolers 74, 75, and radiator 76.

The flows of cooling water out of heater 73, oil coolers 74, 75, and radiator 76 are merged together at water pump housing 77, and directed to water pump 72.

A part of the cooling water that has flowed out of water jacket 31*a* of internal combustion engine 1 is supplied to throttle valve 13 without passing through flow path switching valve 66. However, the quantity of cooling water flowing through throttle valve 13 is very small. Namely, when flow path switching valve 66 is in the fully-closed state described above, the flow of cooling water through water jacket 31a is stopped substantially (i.e. so-called zero-flow state). In circulation system 71, on the downstream side of heater 73, the cooling water supplied to throttle valve 13 is merged with the cooling water exiting from the heater 73, and made to flow into water pump housing 77.

When cooling water temperature Tw of internal combustion engine 1 is low, the cylinder bore wall temperature is also low. In such a condition of low water temperature, condensed water may occur in combustion chamber 5. If condensed water occurs and adheres to inner peripheral surface 32a of cylinder bore 32, the condensed water is mixed with nitrogen oxides (NOx) contained in combustion gas to form acid which may corrode inner peripheral surface 32a of cylinder bore 32.

In internal combustion engine 1 structured to vary the mechanical compression ratio, as the top dead center position is varied, first piston ring 35 and others may slide on a corroded portion of inner peripheral surface 32a of cylinder bore 32. Accordingly, corrosion of inner peripheral surface 32a of cylinder bore 32 may progress due to repetition of a process that the slide of first piston ring 35 and others wears the corroded portion, and the part from which a corroded piece is removed is newly corroded.

In view of the foregoing, while the cylinder bore wall temperature is low, it stops the flow of cooling water in water jacket 31a formed around cylinder bore 32, and thereby increases the cylinder bore wall temperature as quickly as possible, and thereby resolves adhesion of condensed water to inner peripheral surface 32a of cylinder bore 32.

Figure 4:
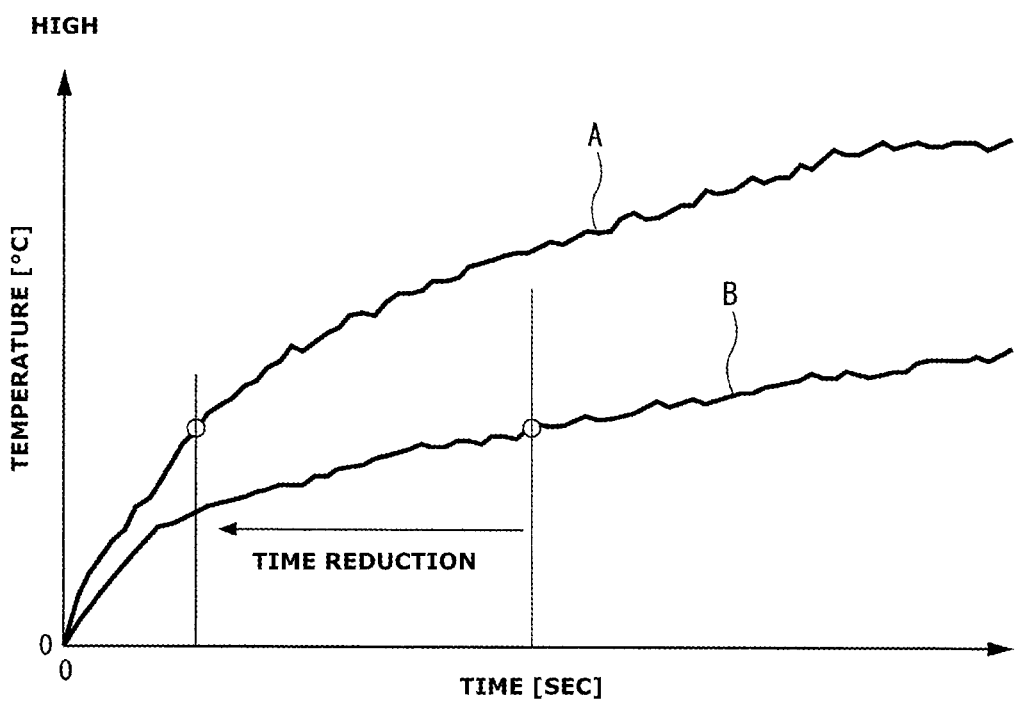
FIG. 4 is an illustrative chart showing characteristics of rise of a cylinder bore wall temperature.

FIG. 4 is an illustrative chart showing characteristics of rise of the cylinder bore wall temperature. In FIG. 4, a characteristic line A represents how the cylinder bore wall temperature changes when the flow of cooling water in water jacket 31a is stopped substantially by setting the flow path switching valve 66 into the fully-closed state. In FIG. 4, a characteristic line B represents how the cylinder bore wall temperature changes when flow path switching valve 66 is controlled to allow only the flow of cooling water to heater 73.

For increasing the cylinder bore wall temperature quickly, it is effective to stop the flow of cooling water in water jacket 31a, as shown in FIG. 4. Namely, when the cylinder bore wall temperature is to be increased to a preset temperature point, it is possible to increase the cylinder bore wall temperature to the preset temperature point within a shorter time period with the flow of cooling water in water jacket 31a being stopped than with the flow of cooling water in water jacket 31a being not stopped.

In this way, by substantially stopping the flow of cooling water in water jacket 31a formed around cylinder bore 32, it is possible to increase the cylinder bore wall temperature quickly, and thereby early resolve adhesion of condensed water to inner peripheral surface 32a of cylinder bore 32. Namely, it is possible to delay the progress of corrosion of inner peripheral surface 32a of cylinder bore 32, by stopping the flow of cooling water in water jacket 31a when cooling water temperature Tw correlating with the cylinder bore wall temperature is lower than preset temperature point Twth.

Preset temperature point Twth is set higher than a point corresponding to a point of the cylinder bore wall temperature at which condensed water occurs on inner peripheral surface 32a of cylinder bore 32. In other words, preset temperature point Twth is set lower than a point corresponding to a point of the cylinder bore wall temperature at which no condensed water occurs on inner peripheral surface 32a of cylinder bore 32. This serves to: stop the flow of cooling water until it becomes impossible that condensed water adheres to inner peripheral surface 32a of cylinder bore 32; and thereby reliably delay the progress of corrosion of inner peripheral surface 32a of cylinder bore 32.

Preset temperature point Twth is set variably in accordance with a temperature correlating with intake air temperature Ta. In the present embodiment, preset temperature point Twth is set variably in accordance with intake air temperature Ta at the intake air inlet which is measured by air flow meter 11.

Since a dew point (a temperature point at which condensed water occurs) varies in accordance with intake air temperature Ta, the setting of preset temperature point Twth in accordance with intake air temperature Ta serves to further reliably delay the progress of corrosion.

Figure 5:
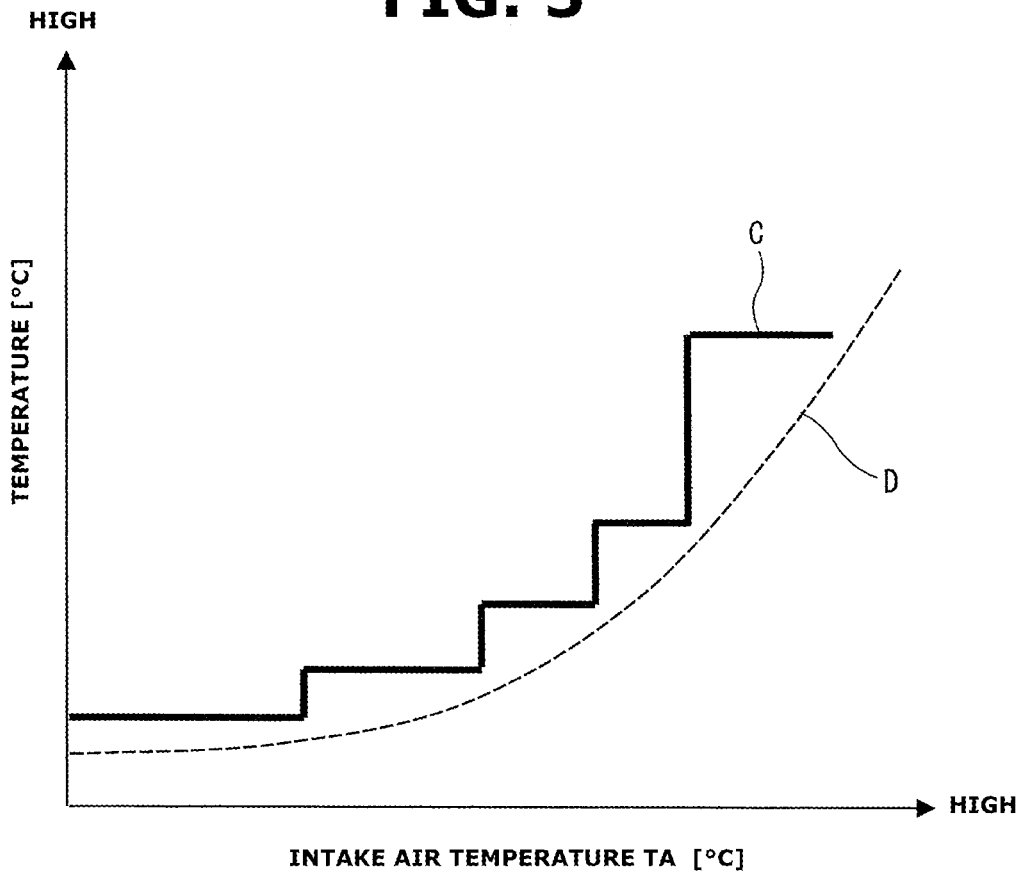
FIG. 5 is an illustrative chart showing correlation between a preset temperature point Twth and an intake air temperature Ta.

Specifically, as shown in FIG. 5, preset temperature point Twth is set to increase as intake air temperature Ta measured by air flow meter 11 increases. In FIG. 5, a characteristic line C in the form of a solid line represents preset temperature point Twth. In FIG. 5, a characteristic line D in the form of a broken line represents a point of cooling water temperature Tw at which no condensed water occurs on the cylinder bore wall. As shown in FIG. 5, preset temperature point Twth is set with a margin to prevent the occurrence of condensed water on inner peripheral surface 32a of cylinder bore 32.

Since the dew point (the temperature point at which condensed water occurs) becomes high depending on intake air temperature Ta, the setting of preset temperature point Twth in accordance with intake air temperature Ta serves to further reliably delay the progress of corrosion.

If the flow of cooling water in water jacket 31a causes the cylinder bore wall temperature to be lower than or equal to the temperature point at which condensed water occurs, corrosion of inner peripheral surface 32a of cylinder bore 32 progresses. Accordingly, preset temperature point Twth is set with a margin, not just equal to the dew point temperature.

Then, when cooling water temperature Tw becomes higher than or equal to preset temperature point Twth, flow path switching valve 66 is controlled to allow the flow of cooling water in water jacket 31a.

Specifically, when cooling water temperature Tw becomes higher than or equal to preset temperature point Twth, the zero-flow control, which substantially stops the flow of cooling water in water jacket 31a, is terminated, and the normal control is started to allow the flows of cooling water to heater 73, oil coolers 74, 75, and radiator 76 downstream of flow path switching valve 66, depending on cooling water temperature Tw.

The zero-flow control is to control valve element 67 of flow path switching valve 66 into the state shutting off all of the flows of cooling water to heater 73, oil coolers 74, 75, and radiator 76.

The normal control is to control valve element 67 of flow path switching valve 66 so as to allow the flows of cooling water to heater 73, oil coolers 74, 75, and radiator 76 in accordance with cooling water temperature Tw.

Figure 6:
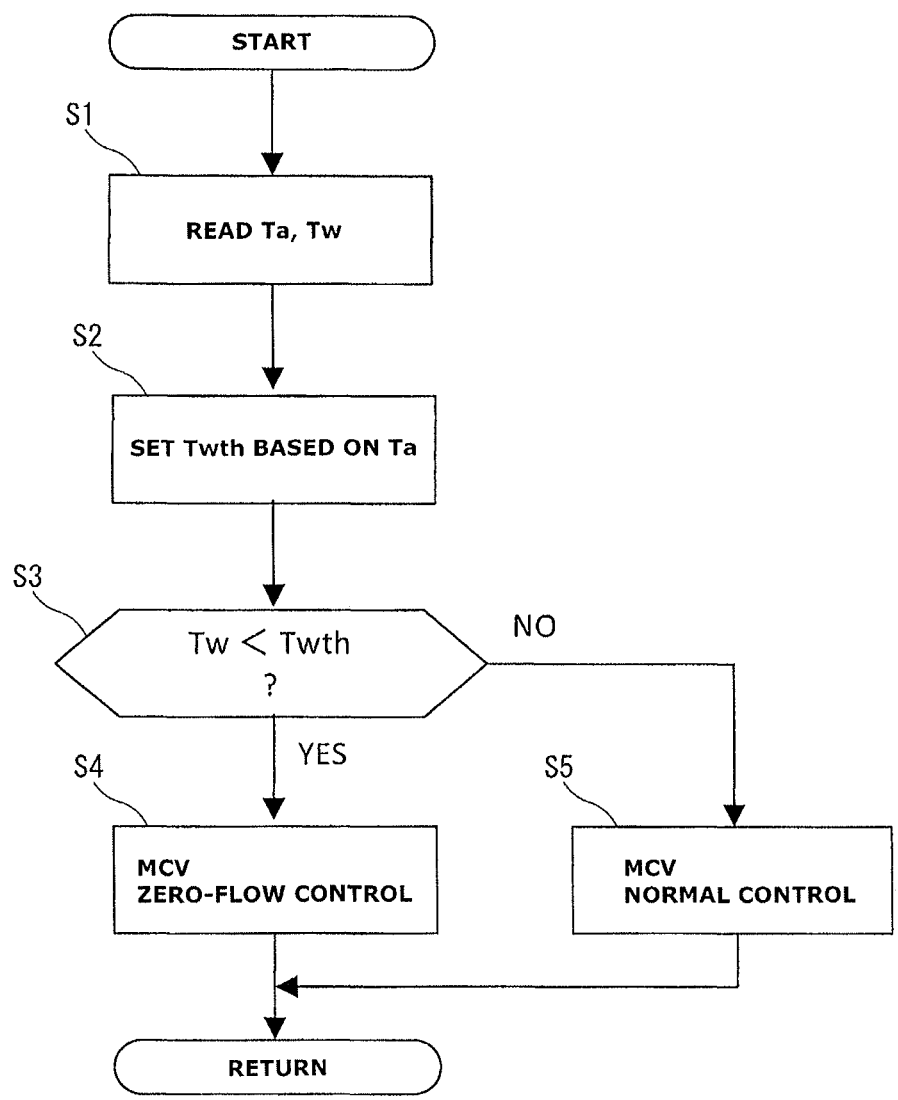
FIG. 6 is a flow chart showing a flow of control of the internal combustion engine according to the present embodiment.

FIG. 6 is a flow chart showing a flow of control according to the present embodiment.

At Step S1, it reads intake air temperature Ta and cooling water temperature Tw. At Step S2, it sets preset temperature point Twth based on intake air temperature Ta read at Step S1. At Step S3, it determines whether or not cooling water temperature Tw read at Step S1 is lower than preset temperature point Twth. When determining at Step S3 that cooling water temperature Tw is lower than preset temperature point Twth, it proceeds to Step S4. When determining at Step S3 that cooling water temperature Tw is higher than or equal to preset temperature point Twth, it proceeds to Step S5. At Step S4, it controls valve element 67 of flow path switching valve 66 so as to substantially stop the flow of cooling water in water jacket 31a (i.e. zero-flow control). At Step S5, it controls valve element 67 of flow path switching valve 66 so as to allow the flow of cooling water into heater 73, oil coolers 74, 75, and radiator 76, depending on cooling water temperature Tw (i.e. normal control).

Although the temperature correlating with the intake air temperature is implemented by the sensed value acquired by air flow meter 11 in the embodiment described above, it may be implemented by an outside air temperature or a temperature of intake air downstream of air flow meter 11. Namely, the intake air temperature acquiring section may be implemented by a temperature sensor for sensing the outside air temperature, or a temperature sensor for sensing the temperature of intake air downstream of air flow meter 11.

The invention claimed is:

1. A control method for an internal combustion engine structured to vary a mechanical compression ratio by varying a range of slide of a piston with respect to a cylinder bore, and structured to control a flow of cooling water in a water jacket formed around the cylinder bore, wherein variation of the mechanical compression ratio causes the piston to slide on a corroded portion formed in the cylinder bore, the control method comprising:
acquiring a temperature correlating with a cylinder bore wall temperature; and
stopping the flow of cooling water in the water jacket, in response to a condition that the acquired temperature is lower than a preset temperature point.

2. The control method as claimed in claim 1, comprising:
setting the preset temperature point higher than a point corresponding to a point of the cylinder bore wall temperature at which condensed water occurs in the cylinder bore.

3. The control method as claimed in claim 1, comprising:
acquiring a temperature correlating with an intake air temperature; and
setting the preset temperature point in accordance with the acquired temperature correlating with the intake air temperature.

4. The control method as claimed in claim 3, comprising:
setting the preset temperature point such that the preset temperature point increases as the acquired temperature correlating with the intake air temperature increases.

5. The control method as claimed in claim 1, comprising:
allowing the flow of cooling water in the water jacket, in response to a condition that the acquired temperature correlating with the cylinder bore wall temperature is higher than or equal to the preset temperature point; and
setting the preset temperature point so as to prevent the cylinder bore wall temperature from being caused by the flow of cooling water in the water jacket to be lower than the point at which condensed water occurs.

6. A control device for an internal combustion engine structured to vary a mechanical compression ratio by varying a range of slide of a piston with respect to a cylinder bore, and structured to control a flow of cooling water in a water jacket formed around the cylinder bore, wherein variation of the mechanical compression ratio causes the piston to slide on a corroded portion formed in the cylinder bore, the control device comprising:
a wall temperature acquiring section structured to acquire a temperature correlating with a cylinder bore wall temperature; and
a cooling water control section configured to stop the flow of cooling water in the water jacket, in response to a condition that the acquired temperature is lower than a preset temperature point.

7. The control method as claimed in claim 2, comprising:
acquiring a temperature correlating with an intake air temperature; and
setting the preset temperature point in accordance with the acquired temperature correlating with the intake air temperature.

8. The control method as claimed in claim 2, comprising:
allowing the flow of cooling water in the water jacket, in response to a condition that the acquired temperature correlating with the cylinder bore wall temperature is higher than or equal to the preset temperature point; and
setting the preset temperature point so as to prevent the cylinder bore wall temperature from being caused by the flow of cooling water in the water jacket to be lower than the point at which condensed water occurs.

* * * * *